United States Patent [19]

Choi

[11] Patent Number: 5,012,341
[45] Date of Patent: Apr. 30, 1991

[54] NOISE REDUCTION CIRCUIT FOR VIDEO CONTROL EMPHASIS SIGNAL

[75] Inventor: Hae-Yong Choi, Suwon, Rep. of Korea

[73] Assignee: SamSung Electronics Co., Ltd., Suwon, Rep. of Korea

[21] Appl. No.: 363,972

[22] Filed: Jun. 9, 1989

[30] Foreign Application Priority Data

Jun. 11, 1988 [KR] Rep. of Korea ............... 1988-7064

[51] Int. Cl.$^5$ .......................................... H04N 5/213
[52] U.S. Cl. ................................... 358/167; 358/36
[58] Field of Search ............ 358/167, 166, 36, 37, 358/162, 178, 340

[56] References Cited

U.S. PATENT DOCUMENTS

| 4,189,755 | 2/1980 | Balbes | 358/166 |
| 4,200,888 | 4/1980 | Blom | 358/162 |
| 4,359,755 | 11/1982 | Srivastava | 358/178 |
| 4,622,520 | 11/1986 | Kuroda | 358/167 |

Primary Examiner—Tommy P. Chin
Attorney, Agent, or Firm—Bushnell, Robert E.; Young-Pil Lee

[57] ABSTRACT

A noise reduction circuit for video contour emphasis signal including an amplification circuit for the contour signal, mean value detection circuit for the contour signal, a noise reduction level control circuit, positive and negative noise reduction circuit and output level control circuit, thereby eliminating the noise signal included in the contour signal and improving the signal to noise ratio.

30 Claims, 4 Drawing Sheets

ΔV2: Q2 turn-on volt. variation

NOISE REDUCTION CIRCUIT FOR VIDEO CONTROL EMPHASIS SIGNAL

BACKGROUND OF THE INVENTION

1. Field of the Invention

The present invention relates to a noise reduction circuit available in a video signal processing apparatus and in particular to a noise reduction circuit for video contour emphasis signals which can eliminate properly the noise signal mixed into the video contour signal and amplified together when the video contour signal for any video system will be emphasized.

2. Description of the Prior Art

Generally, a noise reduction apparatus is usually used in a signal processing circuit for the purpose of improving the signal to noise ratio.

In the video system, when the contour signal is emphasized, the noise signal is amplified synchronously with the contour signal, and thereby the signal to noise ratio is deteriorated.

Therefore, it is necessary to provide a noise reduction means for the video contour emphasis signal.

As for an example in the conventional noise reduction means for improving the S/N ratio, there has been proposed a limiter circuit comprising a pair of diodes D1 and D2 connected in parallel and in opposite polarity to each other as shown in FIG. 1A. The limiter circuit has the noise reduction range 'a' inclusive of the cut-in voltages or the threshold voltages VD1 and VD2 (FIG. 1B) of the respective diodes D1 and D2 and shows the input/output characteristics shown in FIG. 1C so that the noise signal having an amplitude in the range 'a' is allowed to be zero.

The above-mentioned prior art circuit, however, is adapted to limit the noise reduction level within the cut-in voltage VD1 and VD2 as shown in FIG. 1B and 1C, because the cut-in voltages (or threshold voltage) of the respective diodes are fixed and not variable.

Thus it is not possible to change the noise reduction level according to the change of amplitudes of the video contour signal and the noise signal, and so the noise signal having the amplitude beyond the range 'a' shown in FIG. 1C is not effectively reduced.

Further, U.S. Pat. No. 4,571,548 discloses a limiter circuit comprising buffer amplifiers, a low pass filter, and a pair of diodes connected in parallel and in opposite polarity between the input terminal of the low pass filter and the output terminal of the buffer amplifier, wherein the voltage limit is established by the forward voltage drop of two parallel, oppositely-connected diodes which form part of the limiter circuit so as to eliminate the interference signal from the desired signal.

The above limiter circuit, however has shortcomings in that voltage limit against the interference signal also falls into the range based on the forward voltage drop of the respective diodes.

SUMMARY OF THE INVENTION

An object of the present invention is to provide a noise reduction circuit for video contour emphasis for improving the signal-to-noise ratio by eliminating the noise signal amplified simultaneously with emphasizing of the contour signal and for correcting fuzzy picture caused by amplified video input signal.

Another object of the present invention is to provide a noise reduction circuit which is applicable to any system in which a noise reduction function is to be formed.

According to the present invention, there is provided a noise reduction circuit for video contour emphasis signal including an amplification circuit for the contour signal, mean value detection circuit for the contour signal, a noise reduction level control circuit, a positive noise reduction circuit, a negative noise reduction circuit, and output level control circuit.

The noise reduction circuit for the video contour emphasis signal in accordance with this invention can eliminate the noise signal contained in the contour signal according to the noise level by changing the necessary voltage for turn-on of a transistor.

The turn-on of the transistor is accomplished by a field-effect transistor after obtaining the signal corresponding to the level of the noise signal by detecting the mean value of the contour signal.

DESCRIPTION OF THE PREFERRED EMBODIMENT

Figure 1A:
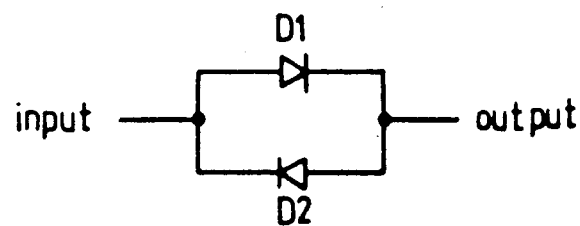
FIG. 1A is a circuit diagram of the conventional noise reduction circuit.
Figure 1B:
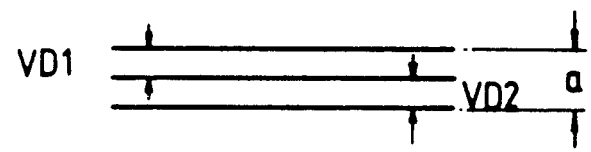
FIGS. 1B and 1C are characteristic views of the circuit shown in FIG. 1A.
Figure 1C:
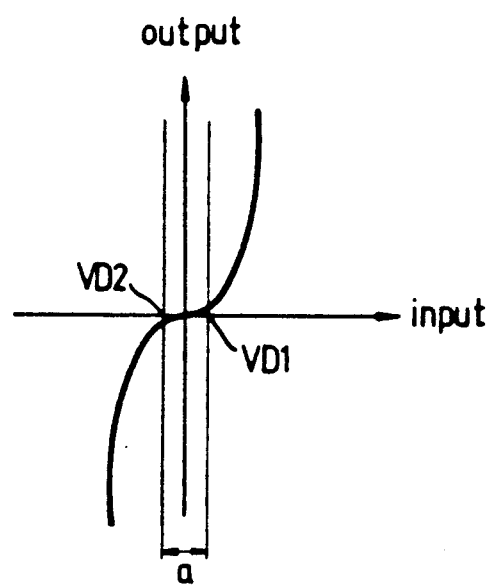
Figure 2:
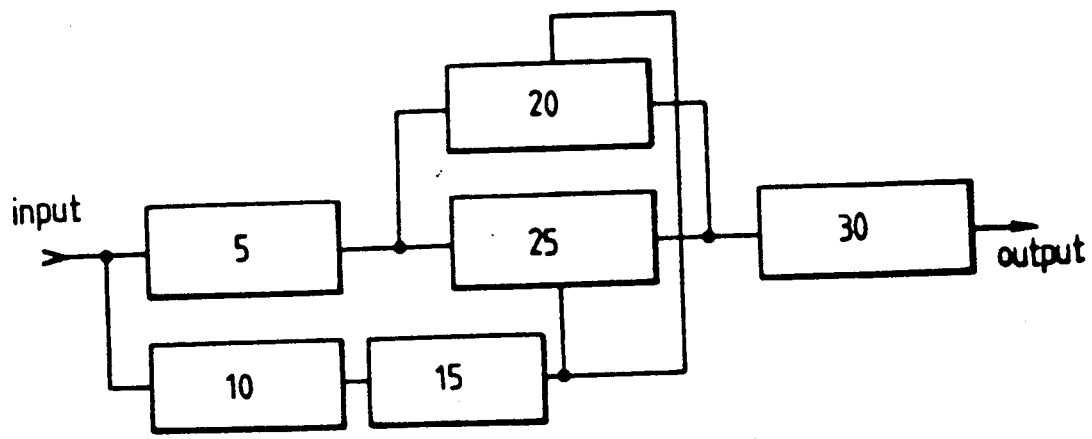
FIG. 2 is a block diagram of the noise reduction for a video contour emphasis signal in accordance with the present invention.

FIG. 2 is a block diagram showing an embodiment of the noise reduction for a video contour emphasis signal in accordance with the present invention, which is composed of an amplification circuit for amplifying the contour signal 5, mean value detection circuit of the contour signal 10, a noise reduction level control circuit 15, a positive noise reduction circuit 20, a negative noise reduction circuit 25, and output level control circuit 30.

Figure 3:
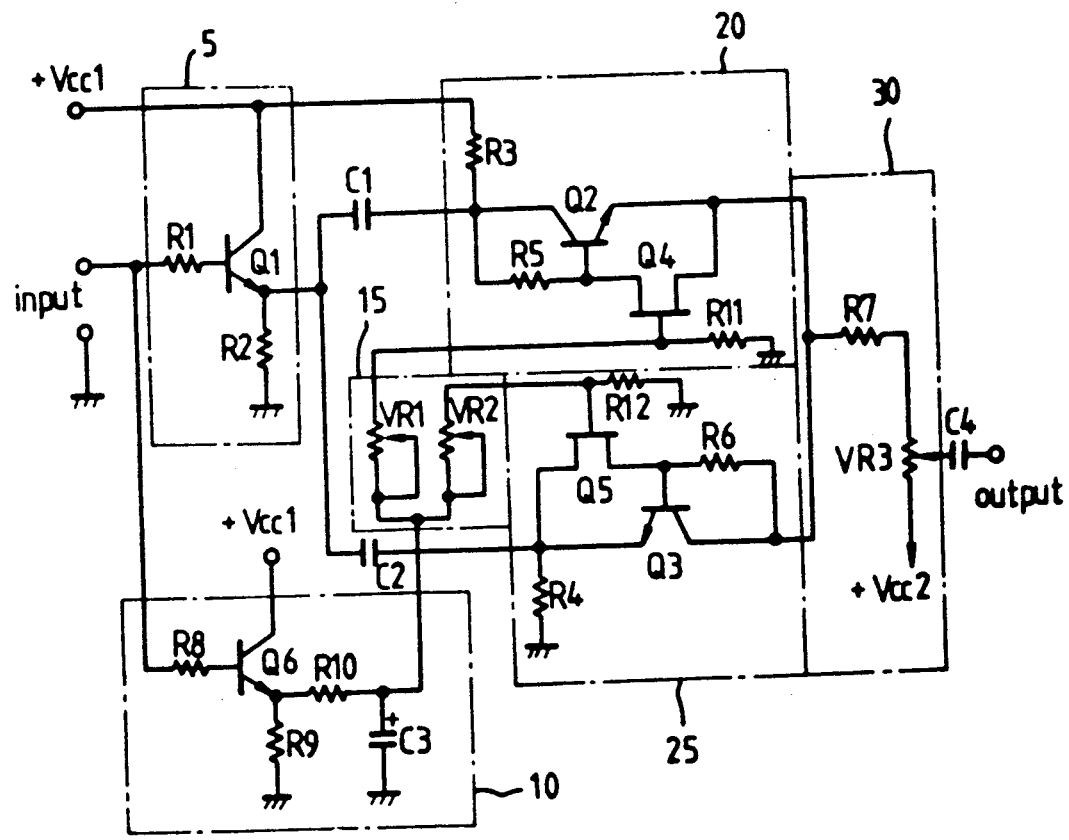
FIG. 3 is a detailed circuit diagram of FIG. 2.

FIG. 3 illustrates a detailed circuit diagram of the block diagram shown in FIG. 2.

As shown in FIG. 3, the contour signal amplification circuit 5 includes a bias resistor R1, a transistor Q1, and an emitter-load resistor R2. The mean value detection circuit for the contour signal 10 includes a bias resistor R8, a transistor Q6, an emitter-load resistor R9, and a resistance R10 and condenser C3 which constitute the integrating circuit. The noise reduction level control circuit 15 includes two variable resistors VR1 and VR2.

In addition, the positive noise reduction circuit 20 has resistors R3 and R5, a transistor Q2, a field effect transistor Q4 and a bias resistor R11, while the negative noise reduction circuit 25 includes resistors R4 and R6, a transistor Q3, a field effect transistor Q5 and a bias resistor R12.

Referring to FIG. 3, the contour signal is amplified in the contour signal amplification circuit 5 including the transistor Q1 to which the resistors R1 and R2 are connected, after which the positive contour signal thereof is applied to the positive noise reduction circuit 20, and the negative contour signal thereof is applied to the negative noise reduction circuit 25, respectively.

At the same time, the contour signal is also amplified in the transistor Q6 to which resistors R8 and R9 are connected, after which the contour signal is integrated by the resistor R10 and the condenser C3 and thereby the mean value of the contour signal may be detected.

The mean value detected in the contour signal mean value detection circuit 10 is controlled by the variable resistors VR1 and VR2 within the noise reduction level control circuit 15 and applied to gates of the field effect transistors Q4 and Q5.

The resistance values between the drain and the source of the field effect transistors Q4 and Q5 are reduced according to the increase of the gate voltage of the field effect transistors to which voltage-dividing resistors R11 and R12 are connected, so that the turn-on voltages of the transistors Q2 and Q3 are increased and in turn the noise reduction level is increased.

Thus, the positive noise signal accompanied by the contour signal is eliminated below the turn-on voltage of the transistor Q2, and at the same time the negative noise signal is eliminated below the turn-on voltage of the transistor Q3.

The contour signal that the noise signal thereof is eliminated by the positive and negative noise reduction circuits 20 and 25 is controlled by the variable resistor VR3 and output through the coupling condenser C4.

FIGS. 4A to 4E are views for explaining the characteristics of the present invention, respectively.

Figure 4A:
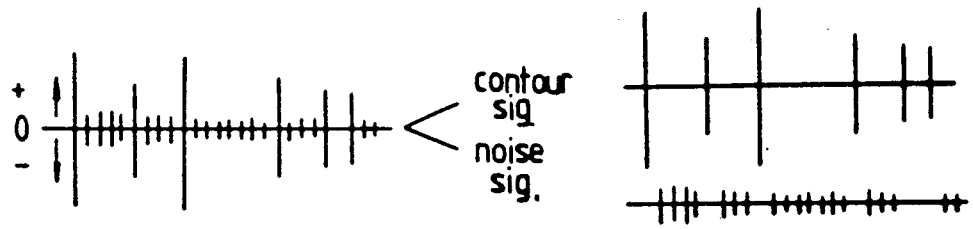
FIG. 4A is a view for explaining that the input video signal comprises the contour signal and the noise signal.
Figure 4B:
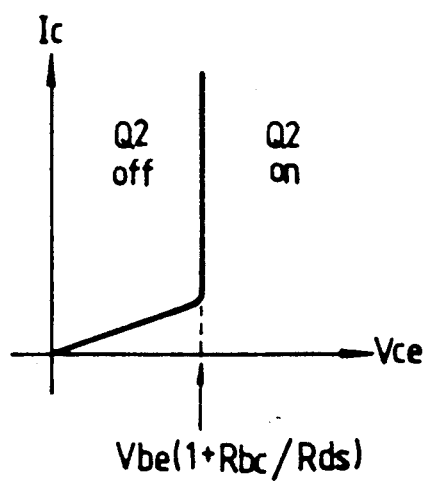
FIG. 4B is an operational explanatory view of the positive noise reduction circuit used in the noise reduction circuit for video contour emphasis signal of this invention.
Figure 4C:
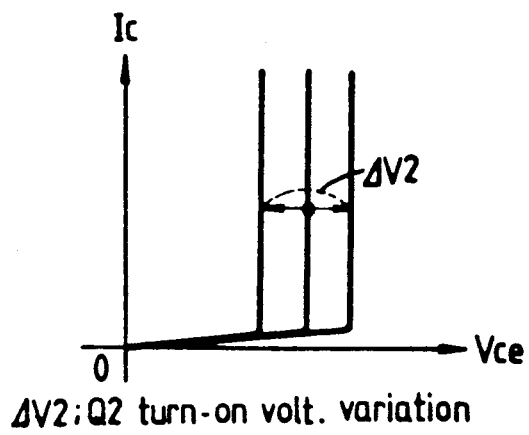
FIG. 4C and 4D are operational explanatory views showing the turn-on voltage change of transistors Q2 and Q3 according to change of resistance values of variable resistors VR1, VR2 and sourcedrain resistances of field effect transistors Q4, Q5.

Referring to FIG. 3 in addition to FIG. 4A to 4E, the input video signal is applied to the contour signal amplification circuit 5 with the contour signal and the noise signal mixed together, as shown in FIG. 4A.

The contour signal accompanying the noise signal is amplified by the transistor Q1 through the bias resistor R1, after which the positive contour signal thereof is applied to the collector of the transistor Q2 via the coupling condenser C1 and at the same time the negative contour signal is applied to the emitter of the transistor Q3 via the coupling condenser C2.

Meanwhile, the contour signal accompanying the noise signal is amplified by the transistor Q6 via the bias resistor R8 and integrated by the integrating condenser C3 and the resistor R10.

Accordingly, the mean value of the contour signal is supplied to the gate of the field effect transistor Q4 in the positive noise reduction circuit 20 and to the gate of the field effect transistor Q5 in the negative noise reduction circuit 25, respectively, through the noise reduction level control circuit 15 which is composed of the variable resistors VR1 and VR2, so that the resistance value Rds between the drain and the source of the field effect transistors Q4, Q5 is charged depending upon the voltage amplitude of the gate to which the voltage dividing resistors R11 and R12 are connected.

As mentioned above, if the voltage applied to the gate of the field effect transistor increases, the resistance value Rds between the drain and the source decreases.

The detailed operation of the positive noise reduction circuit 20 will be explained in the following paragraphs.

The drain and the source of the field effect transistor Q4 are connected between the base and the emitter of the transistor Q2 such that the resistance value between the base and emitter of the transistor Q2 is identical with the resistance value Rds between the drain and the source of the field effect transistor Q4.

In this case, this turn-on voltage of this transistor Q2 is given as Vbe(1+Rbc/Rds) by neglecting the base current, where Vbe is the voltage between the base and the emitter of the transistor Q2, Rds is the resistance between the drain and the source of the field effect transistor Q4, and Rbc is the resistance value between the base and the collector of the transistor Q2.

That is, it will be apparent that as long as the resistance value Rds can be changed depending upon the mean value voltage applied from the detection circuit 10, the turn-on voltage is to be changed according to the level of the noise signal.

In this case, as the contour signal is increased, the noise signal level is also increased, so that the mean value voltage of the contour signal is increased. Furthermore, when the mean value voltage of the contour signal is increased, the resistance value between the drain and the source of the field effect transistor Q4 is decreased and in turn the turn-on voltage of the transistor Q2 is increased, so that the noise signal level is increased, and thereby the positive noise signal can be eliminated.

In the above, the mean voltage of the contour signal applied to the gate of the field effect transistor is controlled by the variable resistor VR1, allowing the resistance value Rds to be set to the desired value.

Figure 4D:
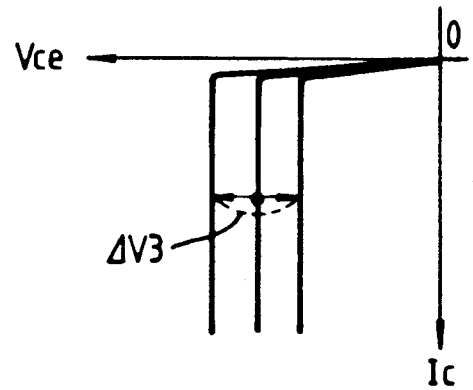

Explanation for the negative contour signal, which is similar with the positive contour signal mentioned above is omitted, FIG. 4C shows the characteristic view that the turn-on voltage of the transistor Q2 is variable according to change of the source-drain resistance value Rds of the field-effect transistor Q4 and the variable resistor VR1, and FIG. 4D shows the turn-on voltage variation of transistor Q3 according to change of the source-drain resistance value Rds of the field effect transistor Q4 and the variable resistor VR2.

As have been described in the foregoing paragraphs, according to this invention, not only the positive noise signal included in the contour signal can be eliminated below the turn-on voltage of the transistor Q2, but the negative noise signal can also be eliminated below the turn-on voltage of transistor Q3.

Then, the contour signal with the noise signal eliminated is supplied to the variable resistor VR3 via output resistor R7, so that it is possible to change the contour signal amplitude output through the coupling condenser C4, depending on the resistance value of the variable resistor VR3.

Figure 4E:
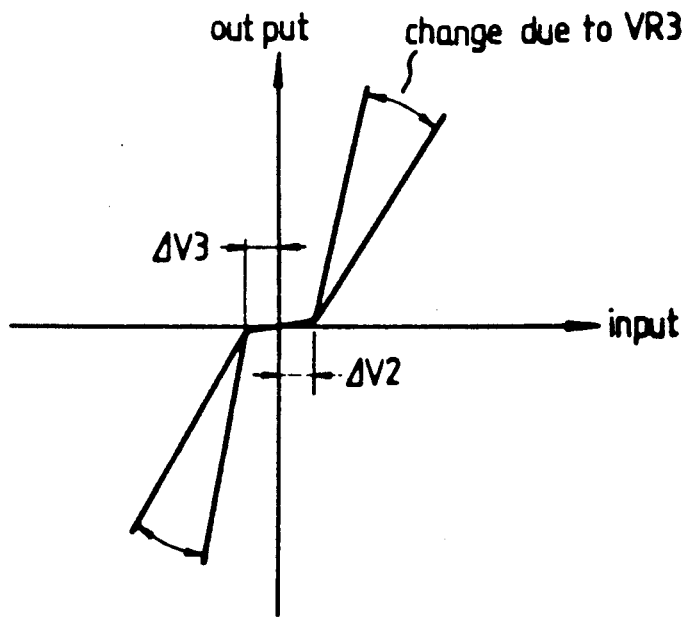
FIG. 4E is the characteristic view of input/output signal level of the noise reduction circuit in accordance with the present invention.

As may be seen from FIG. 4E, showing the input/output characteristic view in accordance with this invention, the noise signals between both turn-on voltages of the transistors Q2 and Q3 is eliminated, only the desired contour signal above the turn-on voltages of the transistors Q2 and Q3 is output, having an output level controlled by the variable resistance value of the variable resistor VR3.

According to the invention being thus described, it is possible to eliminate automatically and adaptively the noise signal mixed into the contour signal according to the level of the noise signal by detecting the signal corresponding to the level of the noise signal included in the contour signal and changing the turn-on voltage of the transistor by means of the field effect transistor, and to match the balance between the positive and negative contour signal.

While the present invention has been described in conjunction with a video system, it will be apparent that the invention is not limited thereto, but is generally applicable to any system in which noise reduction function is to be formed.

Moreover, it will be apparent that many variations may be made in the specific circuit here disclosed, all without departing from the spirit of the invention as defined in the following claims.

I claim:

1. A noise reduction circuit for a video contour emphasis signal, comprising:
   means for amplifying a video input signal;
   means for detecting the mean voltage value of a contour signal within said video input signal;
   first means for controlling noise reduction level by changing the mean voltage value detected by said detecting means;
   positive and negative noise reduction means for eliminating positive and negative noise signals, respectively, from the contour signal, after the contour signal, positive noise signal and negative noise signal have been amplified by said amplifying means to a level controlled by said first controlling means; and
   second means for controlling the output level of the contour signal by eliminating the positive and negative noise signals from signals supplied by said positive and negative noise reduction means, respectively.

2. A noise reduction circuit as claimed in claim 1, wherein said positive and negative noise reduction means comprises a positive noise reduction stage and a negative noise reduction stage each having a first transistor, a second transistor and a plurality of first resistors with the resistance value between the base and emitter of each respective first transistor is controlled by the resistance value between the drain and source of each respective second transistor and variably dependent upon the mean voltage value of the contour signal.

3. A noise reduction circuit as claimed in claim 2, wherein said first transistor of said positive noise reduction stage receives said positive noise signal and the base and emitter of said first transistor of said positive noise reduction stage are connected to the drain and source of said second transistor of said positive noise reduction stage.

4. A noise reduction circuit as claimed in claim 2, wherein said first transistor of said negative noise reduction stage receives said negative noise signal and the base and emitter of said first transistor of said negative noise reduction stage are connected to the drain and source of said second transistor of said negative noise reduction stage.

5. A noise reduction circuit as claimed in claim 1, wherein said detecting means comprises
   a third transistor for amplifying the input contour signal;
   a second resistor; and
   a first condenser connected to said second resistor to form an integrating circuit for detecting the mean value of the contour signal amplified by said third transistor.

6. A noise reduction circuit as claimed in claim 2, wherein said first controlling means comprises third and fourth variable resistors each having a first terminal connected at a common node, the second terminal of said third variable resistor is connected to the gate of said first transistor of said positive noise reduction stage and second terminal of said fourth variable resistor is connected to the gate of said first transistor of said negative noise reduction stage.

7. A noise reduction circuit as claimed in claim 6, wherein said detecting means comprises:
   a fourth transistor for amplifying the input contour signal;
   a fifth resistor; and
   a second condenser connected to said fifth resistor to form an integrating circuit for detecting the mean value of the contour signal amplified by said fourth transistor.

8. A noise reduction circuit as claimed in claim 7, wherein said common connection node of said third and fourth variable resistors is connected to the common connection of said fifth resistor and second condenser in said detection means of said noise reduction circuit.

9. A noise reduction circuit as claimed in claim 2, wherein said first transistor of said positive noise reduction means receives said positive noise signal and said base and emitter of said first transistor of said positive noise reduction means are connected to said drain and source of said second transistor of said positive noise reduction stage.

10. A noise reduction circuit as claimed in claim 9, wherein said first transistor of said negative noise reduction stage receives said negative noise signal and said base and emitter of said first transistor of said negative noise reduction means are connected to said drain and source of said second transistor of said negative noise reduction stage.

11. A noise reduction circuit as claimed in claim 10, wherein said detecting means comprises:
   a fifth transistor coupled to amplify the contour signal;
   a sixth resistor; and
   a third condenser connected to said sixth resistor to form an integrating circuit for detecting the mean value of the contour signal amplified by said fifth transistor.

12. A noise reduction circuit as claimed in claim 11, wherein said first controlling means includes seventh and eighth variable resistors each having a first terminal connected at a common node, the common node of said seventh and eighth variable resistors is connected to a common connection between said sixth resistor and third condenser of said mean value detection means, the second terminal of said seventh variable resistor is connected to the gate of said first transistor of said positive noise reduction means and the second terminal of said eighth variable resistor is connected to the gate of said third transistor of said negative noise reduction means.

13. A method of reducing noise in a video contour emphasis signal, comprising the steps of:
   receiving and amplifying a contour signal;
   generating a mean voltage value by amplifying and integrating said received contour signal;
   applying said mean voltage value and a positive amplified contour signal to a first circuit;
   applying said mean voltage value and a negative amplified contour signal to a second circuit;

providing nose eliminated positive contour signals by eliminating the positive noise signals contained in the positive contour signal in said first circuit;

providing nose eliminate negative contour signals by eliminating the negative noise signals contained in the negative contour signal in said second circuit;

combining the noise eliminated positive and negative contour signals; and controlling the amplitude of the combined signals.

14. A method as claimed in claim 13, further comprised of eliminating said positive noise signal by turning on a first transistor in said first circuit.

15. A method as claimed in claim 14, further comprised of eliminating said negative noise signal by turning on a second transistor in said second circuit.

16. A method as claimed in claim 15, further comprising the step of varying the values of first and second resistances to increase the turn-on voltages of said first and second transistors, respectively, after said step of generating.

17. A method as claimed in claim 16, further comprising the step of supplying the contour signal to a resistance for the controlling the amplitude of the combined signal, after said step of combining.

18. A noise reduction circuit for video contour emphasis signals, comprising:

means for receiving and amplifying video contour signals;

means for detecting a mean voltage value of amplified said video contour signals;

first means for controlling noise reduction level by changing the mean voltage value of said detecting means;

positive noise reduction means for eliminating positive noise signals contained in the amplified contour signals from the amplifying means according to a level controlled by said first controlling means; and negative noise reduction means for eliminating negative noise signals contained in the amplified contour signals from the amplifying means according to a level controlled by said first controlling means.

19. A circuit as claimed in claim 18, further comprising:

means for providing a combination of the signals produced by said positive and negative noise reduction means; and second means for controlling the output level of said combination of the signals produced by said positive and negative noise reduction means.

20. A circuit as claimed in claim 19, wherein said positive noise reduction means includes a first transistor, a second transistor and a plurality of first resistors and has the resistance value between the base and emitter of said first transistor being controlled by the resistance value between the drain and source of said second transistor, with said second transistor having a variable drain-source resistance dependent upon the mean value of the amplified video contour signals.

21. A circuit as claimed in claim 20, wherein said negative noise reduction means includes a third transistor, a fourth transistor and a plurality of second resistors, the resistance value between the base and emitter of said third transistor being controlled by the resistance value between the drain and source of said fourth transistor, with said fourth transistor having a variable drain-source resistance dependent upon the mean value of the amplified video contour signals.

22. A circuit as claimed in claim 21, wherein said first transistor receives said positive noise signal and said base and emitter of said first transistor are connected to said drain and source of said second transistor.

23. A circuit as claimed in claim 22, wherein said third transistor receives said negative noise signal and said base and emitter of said third transistor are connected to said drain and source of said fourth transistor.

24. A circuit as claimed in claim 23, wherein said detection means comprises;

a fifth transistor for amplifying the input contour signal;

a third resistor; and a condenser connected to said third resistor to form an integrating circuit for detecting the mean value of the contour signal amplified by said fifth transistor.

25. A circuit as claimed in claim 24, wherein said noise reduction level controlling means having fourth and fifth variable resistors each having a first terminal connected at a common node, said common node of said fourth and fifth variable resistors is connected to a common connection point between said third resistor and condenser of said mean value detection means, the second terminal of said fourth variable resistor is connected to the gate of said first transistor and the second terminal of said fifth variable resistor is connected to the gate of said third transistor.

26. A noise reduction circuit for a video contour emphasis signal, comprising:

means for amplifying a first video input signal having contour signal and noise signal components;

means for detecting the mean voltage value of a second contour signal, said second contour signal being a component of said first video input signal, comprising:

a first transistor for amplifying the contour signal component;

a first resistor; and a condenser connected to said first resistor to form an integrating circuit for detecting the mean value of the amplified contour signal component amplified by said first transistor;

first noise reduction means for eliminating first noise signals from the amplified contour signal component, comprising:

a second transistor for receiving said first noise signals;

a third transistor, a drain and source of said third transistor being connected to a base and emitter of said second transistor and controlling impedance between the base and emitter of said second transistor; and second noise reduction means for eliminating second noise signals from the amplified contour signal component, comprising:

a fourth transistor for receiving said second noise signals;

a fifth transistor, a drain and source of said fifth transistor being connected to a base and emitter of said fourth transistor and controlling impedance between the base and emitter of said fourth transistor; and means for controlling noise reduction level by changing the mean voltage value detected by said detecting means; and means for controlling the output level of the contour signal.

27. A noise reduction circuit for a video contour emphasis signal, comprising:
means for amplifying a video input signal;
means for detecting the mean voltage value of a contour signal within said video input signal;
first means for controlling noise reduction level by changing the mean voltage value detected by said detecting means;
noise reduction means for providing an output signal by eliminating noise signals from the contour signal; and
second means for controlling the output level of the output signal.

28. A noise reduction circuit as claimed in claim 27, wherein said noise reduction means comprises:
a first transistor;
a second transistor controlling the resistance value between a base and emitter of said first transistor; and
a plurality of first resistors to bias said first and second transistors.

29. A noise reduction circuit as claimed in claim 28, wherein said first transistor receives noise signals from said first controlling means and the base and emitter of said first transistor are connected to a drain and source of said second transistor.

30. A noise reduction circuit as claimed in claim 29, wherein said detecting means comprises:
a third transistor for amplifying the contour signal;
a second resistor; and
a condenser connected to said second resistor to form an integrating circuit for detecting the mean value of the contour signal amplified by said third transistor.

* * * * *

UNITED STATES PATENT AND TRADEMARK OFFICE
CERTIFICATE OF CORRECTION

PATENT NO. : 5,012,341

DATED : April 30, 1991

INVENTOR(S) : Hae-Yong CHOI

It is certified that error appears in the above-indentified patent and that said Letters Patent is hereby corrected as shown below:

Claim 13, column 7, line 4, change "Eliminate" to --Eliminated --.

Signed and Sealed this

Seventh Day of December, 1993

*Attest:*

BRUCE LEHMAN

*Attesting Officer*  Commissioner of Patents and Trademarks